US012394070B2

(12) United States Patent
Pourian et al.

(10) Patent No.: US 12,394,070 B2
(45) Date of Patent: Aug. 19, 2025

(54) MULTI-LEVEL OPTICAL FLOW ESTIMATION FRAMEWORK FOR STEREO PAIRS OF IMAGES BASED ON SPATIAL PARTITIONING

(71) Applicant: Intel Corporation, Santa Clara, CA (US)

(72) Inventors: Niloufar Pourian, Los Gatos, CA (US); Oscar Nestares, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 914 days.

(21) Appl. No.: 17/029,896

(22) Filed: Sep. 23, 2020

(65) Prior Publication Data

US 2021/0004969 A1    Jan. 7, 2021

(51) Int. Cl.
*G06T 7/269*    (2017.01)

(52) U.S. Cl.
CPC .... *G06T 7/269* (2017.01); *G06T 2207/10012* (2013.01); *G06T 2207/20021* (2013.01); *G06T 2207/20081* (2013.01)

(58) Field of Classification Search
None
See application file for complete search history.

(56) References Cited

U.S. PATENT DOCUMENTS

2018/0315199 A1* 11/2018 Socek ................ G06T 7/207
2019/0045168 A1   2/2019 Chaudhuri et al.
2019/0080167 A1*  3/2019 Zhu .................. G06F 18/24143
2019/0124337 A1*  4/2019 Ruefenacht .......... H04N 19/56
2019/0156145 A1   5/2019 Pourian et al.
2020/0193609 A1   6/2020 Dharur et al.

FOREIGN PATENT DOCUMENTS

WO       2020050828       3/2020
WO    WO-2020050828 A1 *  3/2020

OTHER PUBLICATIONS

Miyajima, Yusuke, Teruo Yamaguchi, and Hiroshi Harada. "Parallel optical flow estimation by dividing image in section." 2015 15th International Conference on Control, Automation and Systems (ICCAS). IEEE, 2015. (Year: 2015).*
Pathak, Sarthak, et al. "Virtual reality with motion parallax by dense optical flow-based depth generation from two spherical images." 2017 IEEE/SICE International Symposium on System Integration (SII). IEEE, 2017. (Year: 2017).*
Brox, T. et al., "High Accuracy Optical Flow Estimation Based on a Theory for Warping", ECCV 2004.
Dosovitskiy, A. et al., "Flownet: Learning optical flow with convolutional networks", Proceedings of the IEEE International Conference on Computer Vision; 2015.

(Continued)

*Primary Examiner* — Incent Rudolph
*Assistant Examiner* — Meredith Taylor
(74) *Attorney, Agent, or Firm* — Hanley, Flight & Zimmerman, LLC

(57) ABSTRACT

Techniques related to multi-level optical flow estimation are discussed. Such techniques include partitioning each pair of input images into one or more partitions, separately performing optical flow estimation on the partitions, and merging the separately generated optical flow results into a final optical flow map for the pair of input images.

20 Claims, 9 Drawing Sheets

(56) References Cited

OTHER PUBLICATIONS

Fleet, D. et al., "Optical flow estimation", Handbook of mathematical models in computer vision; Springer, Boston, MA, 2006; pp. 237-257.

Hui, T. et al., "Liteflownet: A lightweight convolutional neural network for optical flow estimation", Proceedings of the IEEE conference on computer vision and pattern recognition; 2018.

Ilg, E. et al., "Flownet 2.0: Evolution of optical flow estimation with deep networks", IEEE Conference on Computer Vision and Pattern Recognition; pp. 2462-2470; 2017.

Pixflow, retrieved online via https://github.com/facebook/surround360/tree/master/surround360_render/source/optical_flow on Aug. 6, 2020.

Ren, Z. et al., "Unsupervised deep learning for optical flow estimation", Thirty-First AAAI Conference on Artificial Intelligence; 2017.

Sun, D. et al., "Pwc-net: Cnns for optical flow using pyramid, warping, and cost volume", Proceedings of the IEEE Conference on Computer Vision and Pattern Recognition; 2018.

Sun, D. et al., "Secrets of optical flow estimation and their principles", 2010 IEEE computer society conference on computer vision and pattern recognition; IEEE, 2010.

Wang, Y. et al., "Occlusion aware unsupervised learning of optical flow", Proceedings of the IEEE Conference on Computer Vision and Pattern Recognition; 2018.

Office Action and Search Report for GB Patent Application No. GB2111519.1, dated Dec. 17, 2021.

Apitzsch, A., et al., "Cubes3D: Neural Network based Optical Flow in Omnidirectional Image Scenes", arXiv preprint arXiv:1804.09004 (2018).

Chang, J., et al., "Pyramid stereo matching network", Proceedings of the IEEE Conference on Computer Vision and Pattern Recognition (2018).

Coors, B., et al., "Spherenet: Learning spherical representations for detection and classification in omnidirectional images", Proceedings of the European Conference on Computer Vision (ECCV), 2018.

Cui, Z., et al., "Real-time dense mapping for self-driving vehicles using fisheye cameras", 2019 International Conference on Robotics and Automation (IRCA), IEEE 2019.

Furnari, et al., "Affine covariant features for fisheye distortion local modeling", IEEE Transactions on Image Processing; 2017.

Furnari, et al., "Affine region detectors on the fisheye domain", IEEE International Conference on Image Processing (ICIP); 2014.

Gao, W., et al., "Dual-fisheye omnidirectional stereo", 2017 IEEE/RSJ International Conference on Intelligent Robots and Systems (IROS), IEEE, 2017.

Ilg, E., et al., "Occlusions, motion and depth boundaries with a generic network for disparity, optical flow or scene flow estimation", Proceedings of the European Conference on Computer Vision (ECCV). 2018.

Kita, N., "Evaluation of the Viewpoint Shift for a Fisheye Lens based on Stereo Geometry", International Conference on Digital Image Computing: Techniques and Applications (DICTA), 2016.

Mieloch, Dawid, et al., "Immersive video depth estimation", MPEG, 2020.

Pourian, N., et al., "An End to End Framework to High Performance Geometry-Aware Multi-Scale Keypoint Detection and Matching in Fisheye Imag", 2019 IEEE International Conference on Image Processing (ICIP). IEEE, 2019.

Roxas, M., et al., "Variational Fisheye Stereo", IEEE Robotics and Automation Letters (2020).

Schneider, Johannes, et al., "On the accuracy of dense fisheye stereo", IEEE Robotics and Automation Letters 1.1 (2016: pp. 227-234.

Shah, S., et al., "Depth estimation using stereo fish-eye lenses", Proceedings of 1st International Conference on Image Processing; vol. 2. IEEE, 1994.

Wang, K., et al., "MVDepthNet: real-time multiview depth estimation neural network", 2018 International Conference on 3D Vision (3DV). IEEE, 2018.

Won, C., et al., "Omnimvs: End-to-end learning for omnidirectional stereo matching", Proceedings of the IEEE International Conference on Computer Vision (ICCV) 2019.

Won, C., et al., "Sweepnet: Wide-baseline omnidirectional depth estimation", 2019 International Conference on Robotics and Automation (ICRA), IEEE, 2019.

Artizzu, C., et al., "OmniFlownet: A perspective neural network adaptation for optical flow estimation in omnidirectional images", 25th International Conference on Pattern Recognition, ICPR 2020, 2 pgs.

Pathak, Sarthak, et al., "Distortion-Robust Spherical Camera Motion Estimation via Dense Optical Flow", 2018 25th IEEE International Conference on Image Processing (ICIP), 5 pgs.

Intention to Grant under Section 18(4) for GB Patent Application No. GB2111519.1, dated Jan. 12, 2023.

Intellectual Property Office of United Kingdom, "Notification of Grant," issued in connection with United Kingdom Patent Application No. 2111519.1, dated Feb. 28, 2023, 2 pages.

* cited by examiner

MULTI-LEVEL OPTICAL FLOW ESTIMATION FRAMEWORK FOR STEREO PAIRS OF IMAGES BASED ON SPATIAL PARTITIONING

BACKGROUND

In various contexts, such as stereoscopic image matching, estimating the optical flow between pairs of images (e.g., a stereo pair of images) is an important operation. For example, it may be desirable to perform such optical flow estimation for a stereo pair of images suitable for view interpolation applications. Such optical flow estimation and its effect on view interpolation results is an area of ongoing concern. Currently, deep learning for the purposes of optical flow estimation is being explored and has been found capable of producing improved results relative to traditional approaches. However, such deep learning approaches suffer from memory constraints and can only operate on low resolution images. To generate results for higher resolution images while satisfying memory constraints, the stereo pair of images are down sampled at the input and the estimated flows are up sampled at the output of the network to generate view interpolation results at full input resolution. Such techniques introduce undesirable artifacts in the view synthesis results.

Creating optical flow results between image pairs is critical in many imaging, artificial intelligence, virtual reality, artificial reality, and other contexts. It is desirable to have high quality optical flow results for high resolution images that do not elicit artifacts and other problems. It is with respect to these and other considerations that the present improvements have been needed. Such improvements may become critical as the desire to provide optical flow results in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
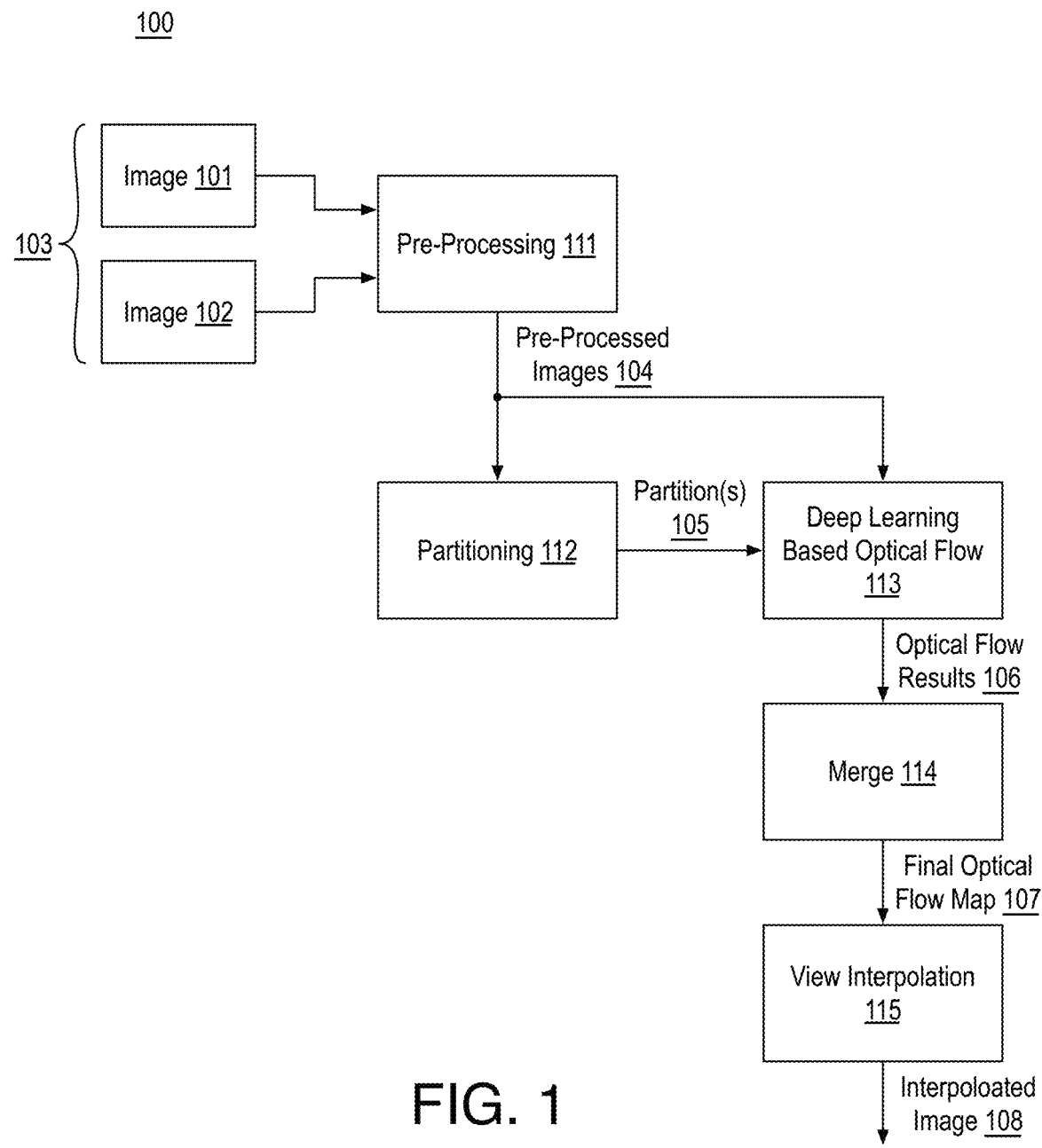
FIG. 1 illustrates an example system for generating a depth image based on multi-level optical flow processing of an input image pair.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to generating optical flow data for a pair of input images using a multi-level optical flow framework.

As described above, creating optical flow results between image pairs is critical in a variety of contexts including imaging, artificial intelligence, virtual reality, artificial reality, and others. Herein, optical flow techniques are discussed with respect to stereoscopy for the generation of, for example, and interpolated image between two images taken from cameras having different views (typically from the same vertical position but differing horizontal positions) of a scene. However, the discussed optical flow techniques may be employed in any context such as stereoscopy using a 2D or 3D array of cameras, optical flow between images or frames of a video sequence, or any other application. Herein, the term image may be used interchangeably with the terms picture and frame. For example, an image may include a three-channel representation of a scene including one channel for each color (e.g., RGB, YUV, etc.) for each pixel of the image. However, an image may be a single channel in some embodiments.

Notably, in some contexts, a deep learning based optical flow processing or deep learning optical flow model or the like has restrictions on the resolution of input images it can process due to memory restrictions (including image processor or GPU memory constraints), processing time restrictions, and others. In some embodiments, a pair of input images are each partitioned into sets of one or more partitions such that each partition meets a resolution constraint of the learning based optical flow processing. As used herein, the term resolution constraint with respect to a deep learning model indicates a threshold resolution (i.e., H×W pixels) that the model is capable of processing. For example, the model may receive an input volume of dimensions H×W×D including D (depth) color channels (e.g., one for each color channel of the input image pair, D=6) each at a resolution of H×W (height by width) pixels. At the native resolution of the input images, the deep learning model is not capable of processing the input image while the deep learning model is capable of such processing for each partition. As used herein, the term partitioning indicates dividing an image into regions that are smaller than the image but at the same pixel density or resolution such that no downsampling is performed.

Each of the corresponding partition pairs between the input images are then separately processed using the discussed deep learning based optical flow processing to generate optical flow results. Such processing may be the same for each partition pair or it may be different. As used herein, the term corresponding partition pair indicates a pair of partitions representative of the same region of both input images. That is, a first partition of a first input image and a second partition of a second input image are corresponding if they cover the same regions or substantially the same regions of each of the first and second input images. The resultant optical flow results provide motion vectors at a resolution of the input to the deep learning based optical flow processing. Such multiple optical flow results are then merged to generate a final optical flow map including motion vectors at the pixel resolution of the input image pair.

In some embodiments, a single partition pair is used such that the partition may cover a maximum overlap region of the input image pair. Such maximum overlap is defined in the field of view (FOV) of the scene being captured using a particular camera set up. For example, some regions of the input image pair, depending on the FOV and set up of image capture, overlap more extensively than other regions. In some embodiments, the single partition pair is selected as being part of a maximum overlap in the FOV. The resultant motion vectors based on deep learning based optical flow processing using the partition pair at the resolution of the input images then provides high quality optical flow results for the partition of greatest overlap. In such embodiments, the input image pair are also downsampled to a resolution that may be processed by the deep learning based optical flow processing and the resultant motion vectors are upsampled to the resolution of the input image pair to generate motion vectors. It is noted that such motion vectors are low quality and can cause image artifacts in subsequent processing. To mitigate or eliminate such problems. The motion vectors from the partition pair are merged into the motion vectors from the downsampling/upsampling processing to provide a final optical flow motion vector field. Such merge may be performed using any suitable technique or techniques. In some embodiments, the region of motion vectors from the partition pair are used in place of the motion vectors from the downsampling/upsampling processing in that region. That is, the motion vectors from the partition pair results are used to replace the upsampled motion vectors. In some embodiments, the motion vectors at a seam between the regions may be smoothed using any suitable filtering techniques such as median filtering.

In some embodiments, multiple partition pairs are employed with each partition pair being separately processed to generate multiple motion vector results at the resolution of the input image pair. As discussed, such motion vector results have higher quality and cause fewer artifacts with respect to motion vectors generated using downsampling/upsampling. The resultant motion vector results (or optical flow results) are then merged. In some embodiments, the partition pairs are non-overlapping and such merger combines the motion vector results for each partition pair into the pertinent region of the resultant optical flow map. In some embodiments, the partition pairs are at least partially overlapping. Such techniques offer advantages in terms of motion vector accuracy and coverage at the cost of greater processing time. In such contexts, the merger uses motion vector results for non-overlapping regions from the pertinent partition pair (that only covers such non-overlapping regions). In overlapping regions (i.e., where two or more optical flow results are available), the optical flow results from the partition pair having the greatest degree of overlap in the FOV (as discussed above) are used. As described, at seams between partition pairs, the motion vectors or optical flow results may be smoothed using filtering techniques. Using such techniques, no upsampling of motion vector results are necessary and the final optical flow results use motion vectors derived from partition pairs having maximum overlap and, therefore, the most information for use by the deep learning based optical flow processing.

The techniques discussed herein provide a multi-level framework for accurate optical flow estimation on large resolution images. Such optical flow results (e.g., motion vector fields) are suitable for use in a variety of contexts including view interpolation applications. The multi-level framework defines various spatial partitions of an image at full resolution to reduce or eliminate the downsampling rate for the input image pair (e.g., input stereo images) that is imposed by the constraints of deep learning based optical flow estimations. The optical flow estimations are then performed (e.g., using separate deep learning based optical flow processing) between partition pairs (e.g., stereo partition pairs), respectively. The optical flow results are then merged to provide highly accurate and low defect optical flow estimation (e.g., optical flow maps, motion vector maps, etc.) for high resolution images. The multi-level framework discussed herein provides a variety of advantages including allowing use of any deep learning based optical flow estimation model having resolution constraints, flexibility to adjust computational cost vs. accuracy, and others.

Such techniques may be used in a variety of contexts and may improve down stream processing due to the high accuracy of the optical flow results. Notably, computer vision applications involved in analyzing multi-view images generally benefit from accurate optical flow estimations. In some embodiments, such techniques are integrated as part of a 3D scene perception for autonomous vehicles, in object tracking for surveillance systems, generating immersive VR content in 360 camera arrays, and many others. In some embodiments, the discussed optical flow estimation techniques are used to define refined depth estimations for generating novel views in omnidirectional imaging to allow for 6 degrees of freedom from a limited set of camera captures with fisheye lenses (e.g., by processing equirectangular images representative of corresponding fisheye images attained via fisheye cameras).

FIG. 1 illustrates an example system 100 for generating a depth image based on multi-level optical flow processing of an input image pair, arranged in accordance with at least some implementations of the present disclosure. As shown in FIG. 1, system 100 includes a pre-processing module 111, a partitioning module 112, a deep learning based optical flow module 113, a merge module 114, and a view interpolation module 115. Although illustrated with respect to view interpolation for the sake of clarity of presentation, a final optical flow map 107 generated as discussed herein may be provided to any suitable component or module of system 100 or stored in memory for later use. For example, final optical flow map 107 may be used in the context of view interpolation (as shown), artificial intelligence applications, virtual reality applications, artificial reality applications, image processing applications, computer vision applications, 3D scene perception applications, object tracking applications, and others.

System 100 may be implemented in any suitable device or grouping of devices. In some embodiments, system 100, or portions thereof, is implemented via a server computer, a cloud computing environment, a personal computer, a laptop computer, a tablet, a phablet, a smart phone, a digital camera, a gaming console, a wearable device, a display device, a virtual reality headset, etc. In some embodiments, system 100 is implemented via a combination of such devices. In some embodiments, system 100 is coupled to one or more cameras to attain input images 101, 102 of a scene. Such cameras may be an array of horizontal cameras, a grid of cameras, a 360 camera array, or the like. In other embodiments, system 100 receives input images 101, 102 from another device.

Input images 101, 102 define an image pair 103 and may include any suitable image types or formats. In some embodiments, input images 101, 102 each include a three-channel input including one channel for each color channel (e.g., RGB, YUV, etc.). Such input images 101, 102 may be characterized as pictures or frames. In some embodiments, input images 101, 102 are planar images of a scene. In some embodiments, input images 101, 102 are equirectangular images representative of corresponding fisheye images attained via fisheye cameras. As used herein the term fisheye image indicates an image captured or generated based on a fisheye view of a scene (e.g., using or corresponding to a fisheye lens having a field of view of not less than 120 degrees and, ideally, not less than 180 degrees). A fisheye image may also be characterized as a spherical image. The fisheye image may be in any suitable format or projection format. The term equirectangular image indicates a projection from the fisheye image onto an equirectangular image plane and the equirectangular image may also be in any suitable format. Notably, the fisheye image corresponds to a fisheye camera used to attain the fisheye image. Input images 101, 102 may have any suitable resolution. For example, input images 101, 102 may have a resolution (H×W) of 1080×1920, 2048×4096, 2160×3840, or the like. In some embodiments, input images 101, 102 video pictures such as high definition (HD), Full-HD (e.g., 1080p), 4K resolution, or 8K resolution video pictures.

Image pair 103 of input images 101, 102 are related in some manner that makes determining an optical flow between them desirable. In some embodiments, input images 101, 102 are images from different views of a scene and final optical flow map 107 may be used to generate a depth image, disparity map, or other correspondence data that is in turn used to generate an interpolated image 108. In other contexts, input images 101, 102 are sequential pictures or frames in a video sequence and final optical flow map 107 represents a motion vector field therebetween that may be used in video encoding for example.

As shown, input images 101, 102 are provided to pre-processing module 111. Pre-processing module 111 may perform any suitable pre-processing on input images 101, 102 to generate pre-processed images 104. In some embodiments, pre-processing module 101 performs Gaussian smoothing, which may provide advantageous images for use in deep learning based optical flow estimation.

In addition or in the alternative, in some embodiments, input images 101, 102 are downsampled by pre-processing module 101. In particular, as discussed further with respect to FIG. 2, input images 101, 102 may be downsampled to a resolution that is below a resolution constraint of the deep learning based optical flow algorithm implemented by deep learning based optical flow module 113. The downsampling is by any suitable factor to meet the resolution constraint. In some embodiments, the downsampling is by a factor of 2 in both the horizontal and vertical dimensions. In parallel, partitioning module 102 receives an image pair at the resolution of input images 101, 102. The image pair may be input images 101, 102 or pre-processed versions of input images 101, 102 (e.g., Gaussian smoothed input images 101, 102). Partitioning module 102 generates one or more partitions in each image of the image pair such that the partition also meets the respect to FIG. 2, input images 101, 102 may be downsampled to a resolution that is below a resolution constraint of the deep learning based optical flow algorithm implemented by deep learning based optical flow module 113. Notably, the discussed downsampling and partitioning both reduce the height and width of an image to values that can be processed by the deep learning based optical flow algorithm. However such techniques differ in that downsampling reduces the resolution relative to the scene being captured (i.e., in pixel density per area or the like) while the partitioning does not reduce the resolution relative to the scene.

The partition pair as generated by partitioning module 102 and the downsampled image pair as generated by pre-processing module 111 are provided to deep learning based optical flow module 113, which separately performs deep learning based optical flow estimation for each of the pairs. That is, deep learning based optical flow estimation is performed using an input volume including the downsampled image pair and deep learning based optical flow estimation is performed using a separate input volume including the partition pair. The deep learning based optical flow estimation may be performed using any suitable technique or techniques. In some embodiments, deep learning based optical flow module 113 employs a convolutional neural network (CNN) based optical flow network. As used herein, the term CNN indicates a pretrained deep learning neural network including an input layer, multiple hidden layers, and an output layer such that the hidden layers include one or more of convolutional layers each including at least a convolutional layer (and optionally including, for example, a leaky RELU layer, a pooling or summing layer, and/or a normalization layer).

Notably, optical flow results 106 generated using the downsampled image pair are at a lower resolution than input images 101, 102 while optical flow results 106 generated using the partition pair is at the full resolution of input images 101, 102. Such optical flow results 106 are merged via merge module 114 to generate final optical flow map 107. In some embodiments, merge module 114 upsamples the optical flow results 106 generated using the downsampled image pair to the resolution of input images 101, 102. The optical flow results are then merged by, for example, using optical flow results 106 generated using the partition pair for a region or regions of final optical flow map 107 corresponding to the partition pair and using the upsampled optical flow results for the remainder of final optical flow map 107. Such techniques are discussed further herein below.

Returning to discussion of pre-processed images 104, in some embodiments, input images 101, 102 are not downsampled. In such examples, an image pair (i.e., input images 101, 102 or pre-processed images 104 at the same resolution) are provided to partitioning module 112. In such contexts, as discussed further with respect to FIG. 6, partitioning module 112 partitions each of the full resolution images of the image pair to corresponding sets of partitions 105 such that partitions 105 are at the resolution of input images 101, 102. Partitions 105 may advantageously overlap in some embodiments.

Each partition pair (i.e., one partition from input image 101 and a matching or corresponding partition from input image 102) of partitions 105 are provided to deep learning based optical flow module 113, which separately performs deep learning based optical flow estimation for each of the pairs. That is, deep learning based optical flow estimation is performed using a first input volume including one partition pair, separate deep learning based optical flow estimation is performed using a second input volume including another partition pair, deep learning based optical flow estimation is performed using a third input volume including yet another partition pair, and so on, with each deep learning based optical flow estimation generating an optical flow result for the partition pair.

Notably, optical flow results 106 generated using the partition pairs are at the full resolution of input images 101, 102. Such optical flow results 106 are merged via merge module 114 to generate final optical flow map 107. In some embodiments, merge module 114 assembles optical flow results 106 from each partition pair to generate final optical flow map 107. Final optical flow map 107 may include any suitable data structure such as a motion vector for each pixel at a resolution of input images 101, 102. In embodiments where no overlap is used, merge module 114 may stitch together optical flow results 106 to a full final optical flow map 107, optionally including smoothing at the seams. In embodiments where partition overlaps are used, merge module 114 may use the only available optical flow results 106 for non-overlapping regions and selected optical flow results 106 (e.g., between partition pairs) for overlapping regions. The selection may be performed using any suitable technique or techniques such as selecting the partition pair that is most central in input images 101, 102. In some embodiments, the selection is based on a greater degree of overlap in a field of view of input images 101, 102 between the partition pairs in the field of view of c.

As shown, final optical flow map 107 may be used in any suitable context such as view interpolation as performed by view interpolation module 115 to generate an interpolated image 108. View interpolation module 115 may generate interpolated image 108 using any suitable technique or techniques. Furthermore, interpolated image 108 may be used in any image processing, artificial intelligence, virtual reality, augmented reality, or any other context discussed herein.

Figure 2:
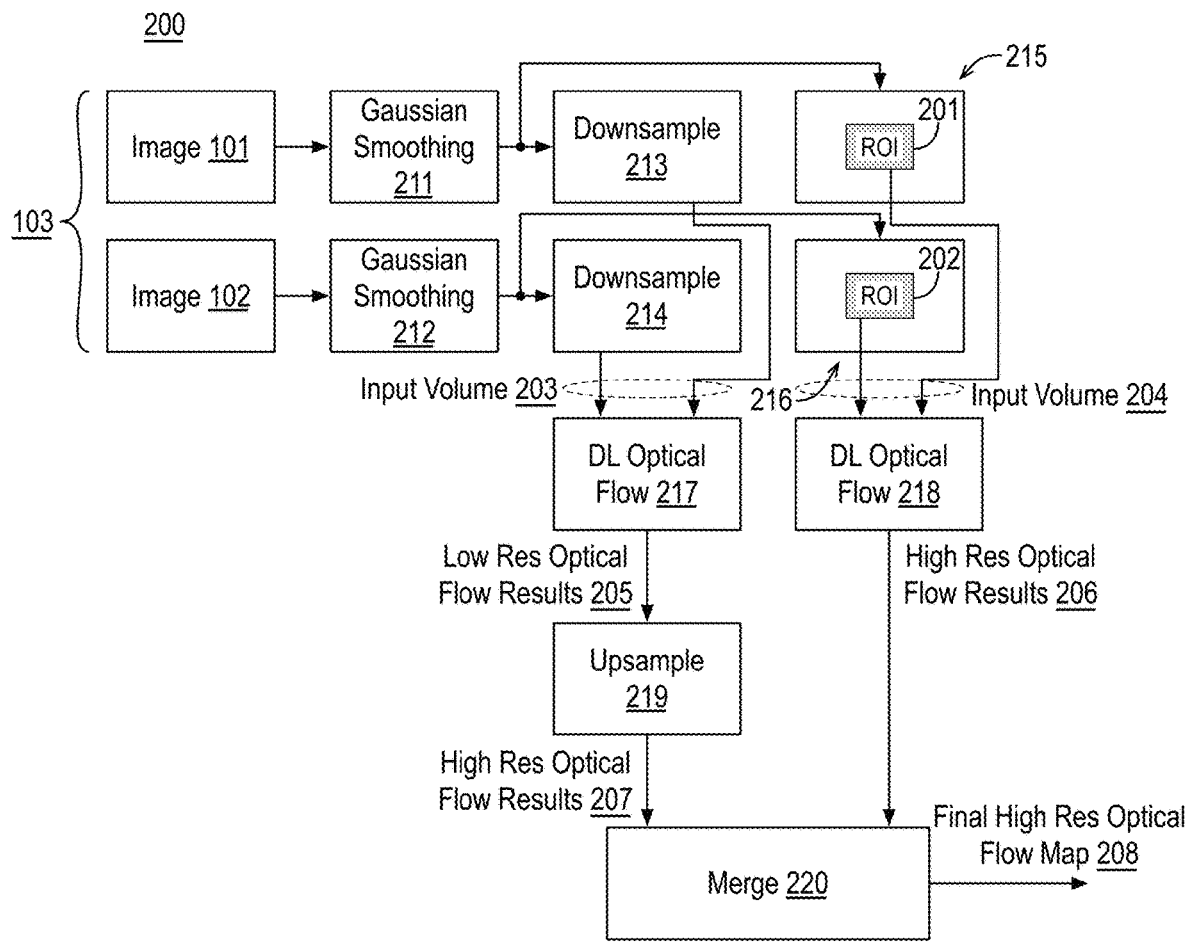
FIG. 2 illustrates an example implementation of system for generating a high resolution optical flow map based on an input image pair.

FIG. 2 illustrates an example implementation 200 of system 100 for generating a high resolution optical flow map based on an input image pair, arranged in accordance with at least some implementations of the present disclosure. As shown in FIG. 2, implementation 200 includes Gaussian smoothing modules 211, 212, downsample modules 213, 214, partitioning modules 215, 216 (with the results of such modules shown for the sake of clarity, deep learning optical flow modules 217, 218, an upsample module 219, and a merge module 220. For example, with reference to FIG. 1, pre-processing module 111 may implement Gaussian smoothing modules 211, 212 and downsample modules 213, 214, partitioning module 112 may implement partitioning modules 215, 216, deep learning based optical flow module 113 may implement deep learning optical flow modules 217, 218, and merge module 114 may implement merge module 220.

As shown in FIG. 2, one processing branch may be defined by optional Gaussian smoothing modules 211, 212, downsample modules 213, 214, deep learning optical flow module 217, and upsample module 219. In this processing branch, input images 101, 102 or preprocessed versions as generated by optional Gaussian smoothing modules 211, 212 are first downsampled to a resolution constraint of the deep learning based optical flow algorithm. That is, input images 101, 102 or preprocessed versions thereof are downsampled to a resolution that may be processed by deep learning optical flow module 217 while, notably, input images 101, 102, cannot be processed at their full resolution. The resultant downsampled images provide an input volume 203 inclusive of the downsampled images. For example, input volume 203 may be a concatenation of the downsampled images such that input volume 203 has six channels or feature maps (one each for the color channels of the downsampled images) each at the resolution of the downsampled images.

Deep learning optical flow module 217 is applied to input volume 203 to generate output low resolution optical flow results 205. Low resolution optical flow results 205 may have any suitable data structure such as a per pixel motion vector map at the resolution of the downsampled images of input volume 203. Deep learning optical flow module 217 may employ any deep learning based optical flow estimation model or techniques. In some embodiments, deep learning based optical flow estimation model is a CNN based model such as a Flownet based CNN model. Notably, the techniques discussed herein may employ any suitable deep learning based optical flow estimation model.

Figure 3:
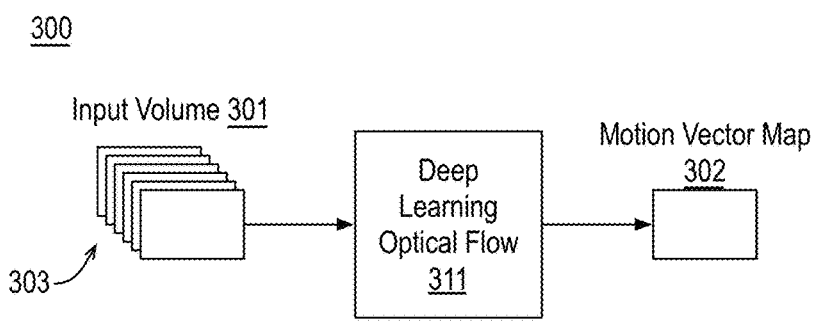
FIG. 3 is an illustration of an example application of a deep learning optical flow module to an input volume to generate a motion vector map of optical flow results.

FIG. 3 is an illustration of an example application of a deep learning optical flow module 300 to an input volume to generate a motion vector map of optical flow results, arranged in accordance with at least some implementations of the present disclosure. As shown in FIG. 3, deep learning optical flow module 300 applies a deep learning optical flow estimation model 311 to an input volume 301 to generate a motion vector map (i.e., optical flow results). Deep learning optical flow module 300 may be employed in any deep learning based optical flow context discussed herein such as those discussed with respect to modules 113, 217, 218, or 611a-i. As shown, input volume 301 includes any number of images or feature maps 303. In an embodiment, input volume 301 includes 3 feature maps for a downsampling or partitioning of input image 101 and 3 feature maps for a downsampling or partitioning of input image 102. That is, a downsampled image or an image partition from input image 101 may be concatenated with a corresponding downsampled image or a corresponding image partition from input image 101 to provide input volume 301.

Any suitable deep learning optical flow estimation model may be used, as applied to input volume 301, to generate a motion vector map 302. Notably, deep learning optical flow estimation model 311 may include a number of CNN layers that each generate output feature maps that are provided to a subsequent CNN layer, and so on through generation of motion vector map 302, although any suitable architecture may be used. Furthermore, deep learning optical flow estimation model 311 may be pretrained for deployment based on a large number of training instances including examples of downsampled image pairs or partitioned image pairs (to provide training input volumes) and corresponding ground truth motion vector maps (as used to pretrain the model in a supervised or unsupervised setting).

As discussed, deep learning optical flow estimation model 311, as implemented in hardware or any suitable computing context, may have a resolution constraint such that the deployment can only handle input volume 301 at or below a particular resolution. Such constraints are achieved via the downsampling and partitioning techniques discussed herein while the multi-level processing and merger techniques attain high quality optical flow results as compared to simple downsampling and upsampling.

Returning to FIG. 2, low resolution optical flow results 205 are provided to upsample module 219, which upsamples low resolution optical flow results 205 to generate high resolution optical flow results 207 that are at the resolution of input images 101, 102. Upsample module 219 may upsample low resolution optical flow results 205 to generate high resolution optical flow results 207 using any suitable technique or techniques.

As shown in FIG. 2, a second processing branch may be defined by optional Gaussian smoothing modules 211, 212, partitioning modules 215, 216, and deep learning optical flow module 218. In this processing branch, input images 101, 102 or preprocessed versions as generated by optional Gaussian smoothing modules 211, 212 are partitioned into one or more corresponding partitions 201, 202. As discussed, partitioning indicates attaining a portion or region of an image without changing the resolution.

In the illustrated embodiment, partitions 201, 202 are at a center of input images 101, 102 or preprocessed versions thereof and have a maximum size that may be processed by deep learning optical flow module 218. However, partitions 201, 202 may be selected using any suitable technique or techniques and may be at any suitable size. In some embodiments, partitions 201, 202 correspond to a maximum overlap region in a field of view of input images 101, 102 that meets a resolution constraint of the deep learning based optical flow algorithm implemented by deep learning optical flow module 218. As used herein, the term overlap region in a field of view indicates an expected overlap in images as attained from a scene. For example, any number of cameras in an array may be assembled into the array and trained onto a scene. Based on the assembled geometry and the scene characteristics, overlap regions in the field of view as established by the assembly and scene may be determined. Such overlap is typically expected or arranged to be at or toward the center of input images 101, 102; however, other arrangements are available. Such overlap regions in a field of view, degree of overlap for a particular partition, and similar overlaps in the field of view (which are distinct from partition overlaps as discussed further herein) may be provided as given in the establishment of the geometries of the cameras used to attain input images 101, 102 and the scene represented by input images 101, 102.

Corresponding partitions 201, 202 provide an input volume 204 inclusive of the image regions of partitions 201, 202. For example, input volume 204 may be a concatenation of image partitions 201, 202 such that input volume 204 has six channels or feature maps (one each for the color channels of partitions 201, 202) each at the resolution of partitions 201, 202. Deep learning optical flow module 218 is applied to input volume 204 to generate high resolution optical flow results 206, which may have any suitable data structure such as a per pixel motion vector map at the resolution of input images 101, 102 (although not covering the full area of input images 101, 102).

Merge module 220 receives high resolution optical flow results 206 and high resolution optical flow results 207 and merge module 220 merges them to form a final high resolution optical flow map 208. Final high resolution optical flow map 208 may have any suitable data structure such as a data structure representative of a per pixel motion vector map having a resolution of input images 101, 102. Merge module 220 may merge high resolution optical flow results 206 and high resolution optical flow results 207 using any suitable technique or techniques. In some embodiments, for the region of high resolution optical flow map 208 corresponding to partitions 201, 202, the motion vectors of high resolution optical flow results 206 are used. That is, the pixels of the region of high resolution optical flow map 208 corresponding to partitions 201, 202 may be populated with the motion vectors of high resolution optical flow results 206. For the remainder of high resolution optical flow map 208 (i.e., the region outside of the region corresponding to partitions 201, 202), the motion vectors of high resolution optical flow results 207 are used.

Figure 4:
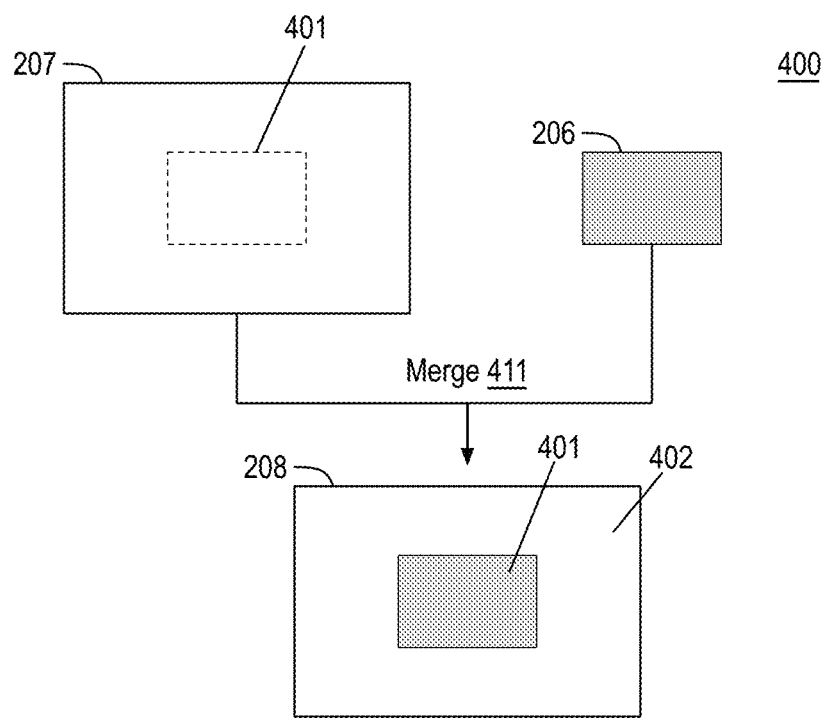
FIG. 4 is an illustration of an example merger of high resolution optical flow results to form a high resolution optical flow map.

FIG. 4 is an illustration of an example merger 400 of high resolution optical flow results 206 and high resolution optical flow results 207 to form high resolution optical flow map 208, arranged in accordance with at least some implementations of the present disclosure. As shown in FIG. 4, high resolution optical flow results 207 have a particular resolution and size matching that of input images 101, 102. That is, high resolution optical flow results 207 provide a full resolution motion vector map for input images 101, 102 (albeit based on downsampling/upsampling processing). Also as shown, high resolution optical flow results 206 have a resolution and size matching that of image partitions 201, 202. For example, high resolution optical flow results 206 provide a full resolution motion vector map for only a region 401 of high resolution optical flow results 207 and high resolution optical flow map 208; however, such high resolution optical flow results 206 are less likely to have defects or to cause image artifacts since they were generated without downsampling/upsampling processing. Avoiding such defects in region 401 is particularly advantageous since region 401 is toward a center of high resolution optical flow map 208 (where they are more likely to be noticed) and at a region of higher overlap in the field of view, as discussed above.

As shown, in some embodiments, high resolution optical flow results 206 and high resolution optical flow results 207 are merged via merge operation 411 such that, for region 401 of high resolution optical flow map 208, the motion vectors or other optical flow information of high resolution optical flow results 206 are used and for other region(s) 402 of high resolution optical flow map 208, the motion vectors or other optical flow information of high resolution optical flow results 207 are used. That is, high resolution optical flow map 208 is populated with the motion vectors or other optical flow information of high resolution optical flow results 206 for any region or regions having optical flow data generated via application of a deep learning based optical flow model at full resolution are populated using such optical flow data and other regions are populated using optical flow data generated via downsampling, application of the deep learning based optical flow model at the lower resolution, and subsequent upsampling.

Figure 5:
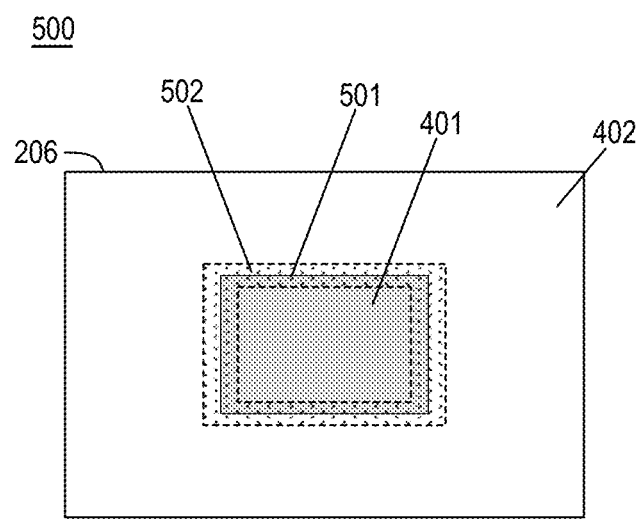
FIG. 5 is an illustration of exemplary smoothing of optical flow results at a merger seam.

FIG. 5 is an illustration of exemplary smoothing 500 of optical flow results at a merger seam, arranged in accordance with at least some implementations of the present disclosure. As shown in FIG. 5, after merge operation 411, a smoothing may be performed at a seam 511 between region 401 and region 402. As used herein, in the context of optical flow result smoothing, a seam is any line or edge that separates motion vectors from one source from motion vectors from another source. As discussed, in the context of FIG. 5, motion vectors in region 401 are from high resolution optical flow results 206 while motion vectors in region 402 are from high resolution optical flow results 207.

As shown, in a region 502 encompassing seam 501, a smoothing may be performed to reduce any abrupt value changes across seam 501. Such smoothing may be performed using any suitable technique or techniques. In some embodiments, such smoothing includes application of a filter such as a median filter or the like. In some embodiments, the filter is a linear filter applied orthogonal to seam 501. In some embodiments, the filter is a two-dimensional filter having a square or diamond shape. Other filter techniques are available.

Returning to FIG. 2, high resolution optical flow map 208 may be used in any context discussed herein. For example, with reference to FIG. 1, high resolution optical flow map 208 may be provided as final optical flow map 107 for use by view interpolation module 115.

With continued reference to FIG. 2, processing using a multi-level optical flow estimation framework may proceed as follows. Let $N_y$ and $N_x$ represent the height and width of an input stereo pair of images (i.e., input images 101, 102) at their original resolution. In some embodiments, one or more localized partitions are integrated into a multi-level optical flow estimation framework. In one branch, the input stereo pair (i.e., input images 101, 102) are down sampled (i.e., via downsample modules 213, 214) to the highest resolution that meets the resolution constraints (e.g., GPU memory constraints) of a deep learning based optical flow estimation technique being employed and used as input (i.e., input volume 203) to the optical flow network (i.e., as implemented via deep learning optical flow module 217). The resulting estimated flow map (i.e., low resolution optical flow results 205) of this branch are then upsampled to the original resolution of the input stereo pairs (i.e., input images 101, 102) to generate an upsampled estimated flow map (i.e., high resolution optical flow results 207). In some embodiments, the downsampling is by a factor of 2 in both the horizontal and vertical directions (i.e., the downsampled images are ½ the resolution of input images 101, 102 in both the horizontal and vertical directions).

In another branch, the optical flow estimate is determined on sub-portions (i.e., partitions 201, 202) of the stereo image pair (i.e., input images 101, 102). In some embodiments, a maximum overlapping area is defined in the stereo pair of images (i.e., input images 101, 102) that meets the resolution constraints (e.g., GPU memory constraints) without the need to downsample. In some embodiments, the partition pairs (i.e., partitions 201, 202) is defined by a rectangular area enclosed inside a region of overlap between the stereo pair as input to the optical flow network to generate a resulting estimated flow map (i.e., high resolution optical flow results 206). Although illustrated with respect to rectangular partitions 201, 202, any suitable shape may be used.

A merging technique is then applied on the estimated optical flow maps of the branches (i.e., high resolution optical flow results 207, 208) to define a more refined optical flow estimation (i.e., high resolution optical flow map 208) for the stereo input pair (i.e., input images 101, 102) that is more suitable for view interpolation and other applications. Depending on the multi-level framework used, different merging/blending functions can be used. In some embodiments, the estimated flow maps (i.e., high resolution optical flow results 207, 208) of the two branches are merged by replacement giving higher priority to the estimated optical flow map of the second branch, which defines optical flow estimation on localized image partitions 201, 202 at the original resolution.

Figure 6:
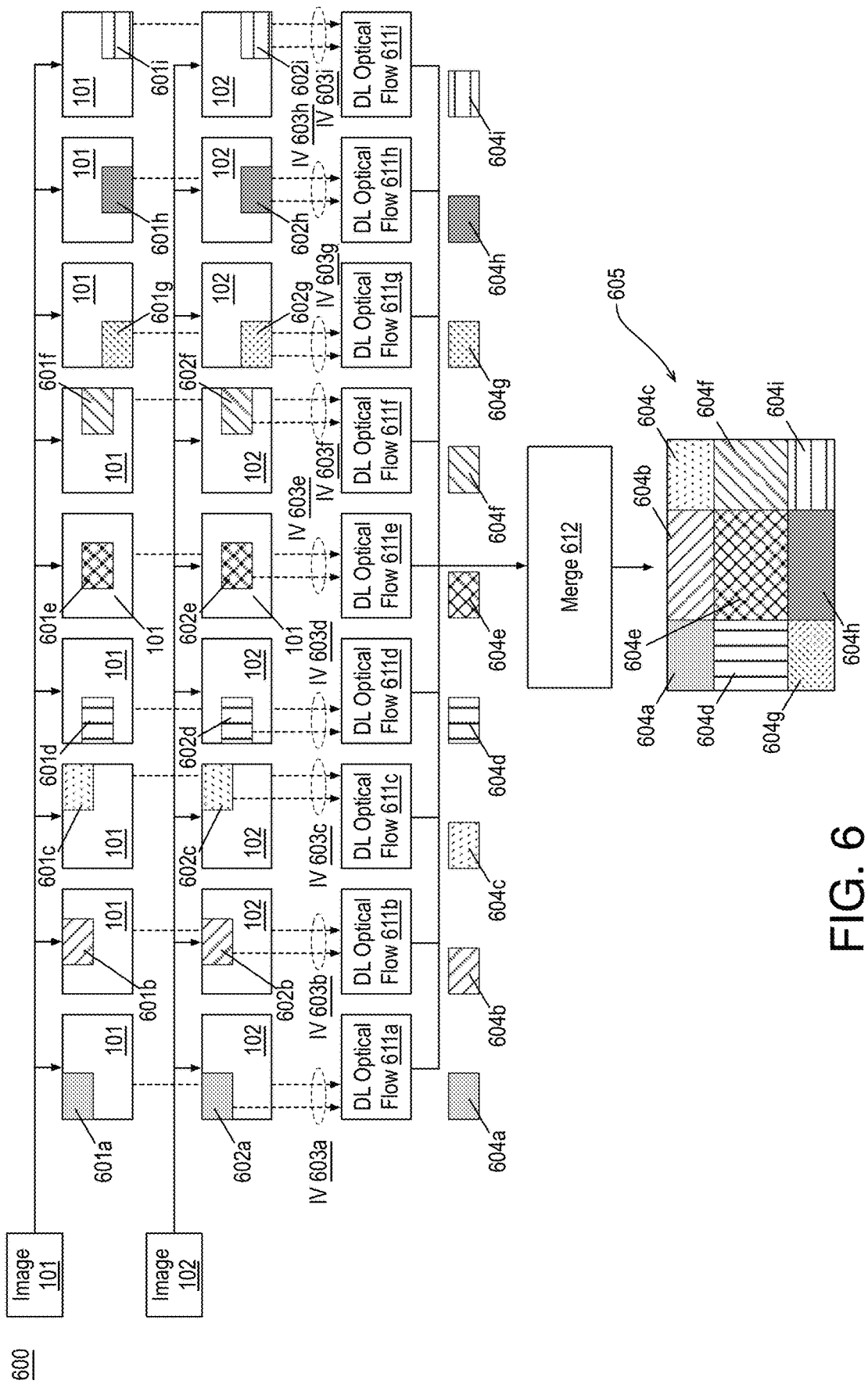
FIG. 6 illustrates another example implementation of system for generating a high resolution optical flow map based on an input image pair.

FIG. 6 illustrates another example implementation 600 of system 100 for generating a high resolution optical flow map based on an input image pair, arranged in accordance with at least some implementations of the present disclosure. As shown in FIG. 6, implementation 600 divides each of input images 101, 102 into a set of partitions. Although illustrated with respect to processing input images 101, 102, in some embodiments, pre-processed images may be used. Such pre-processed images may be Gaussian smoothed images, downsampled versions of input images 101, 102, or the like. As shown in FIG. 6, implementation 600 includes partitioning (e.g., via a partitioning module such as partitioning module 112), deep learning optical flow modules 611a-i, and a merge module 612. For example, with reference to FIG. 1, pre-processing module 111 may implement any of the discussed pre-processing, partitioning module 112 may implement the illustrated partitioning, deep learning based optical flow module 113 may implement deep learning optical flow modules 611a-i, and merge module 114 may implement merge module 612.

Input image 101 (or a preprocessed image) is divided or partitioned into a set 601 of partitions 601a-601i such that partition 601a is at a top-left corner, partition 601b is at a top-center, partition 601c is at a top-right corner, partition 601d is at a middle-left, partition 601e is at a center, partition 601f is at a middle-right, partition 601g is at a bottom-left corner, partition 601h is at a bottom-center, and partition 601i is at a bottom-right corner of input image 101. In the illustrated embodiment, nine overlapping partitions are used such that the area of overlap of each partition is half of its neighboring partition. For example, partition 601a overlaps partition 602b by half in the horizontal dimension and partition 601d in the vertical dimension. However, any number of partitions having any partition overlap percentage may be employed. In some embodiments, four, sixteen, or more partitions may be employed at overlap percentages of 50% in both dimensions (as discussed), 25% in both dimensions, 30% in both dimensions, or other percentage overlaps. Furthermore, in some embodiments, no overlap is employed and each of partitions 601a-i are immediately adjacent to their neighboring partitions.

Input image 102 (or a preprocessed image) is divided or partitioned in the same manner into a set 602 of partitions 602a-602i. Notably, corresponding ones of partitions 602a-602i include the same or substantially the same regions of input image 102 as those of partitions 601a-601i of input image 101. For example, partition 602a includes the same or substantially the same region of input image 102 as the region of input image 101 of partition 601a, 602b includes the same or substantially the same region of input image 102 as the region of input image 101 of partition 601b, 602c includes the same or substantially the same region of input image 102 as the region of input image 101 of partition 601c, and so on. Thereby, set 601 and set 602 of partitions 601a-601i and partitions 602a-602i, respectively, have corresponding partition pairs: partitions 601a, 602a being a first pair, partitions 601b, 602b being a second pair, partitions 601c, 602c being a third pair, and so on.

As shown, each of the partition pairs provide a separate one of input volumes 603a-603i. That is, partitions 601a, 602a provide an input volume 603a, partitions 601b, 602b provide an input volume 603b, partitions 601c, 602c provide an input volume 603c, and so on. Each of input volumes 603a-603i are separately processed by deep learning optical flow modules 611a-611i, which each apply a deep learning based optical flow estimation model to input volumes 603a-603i, respectively, to generate high resolution optical flow results 604a-604i. High resolution optical flow results 604a-604i provide optical flow results (e.g., pixel level motion vectors) at the same resolution as that of input images 101, 102.

Deep learning optical flow modules 611a-611i may separately employ the same or differing deep learning based optical flow estimation models. Furthermore, deep learning optical flow modules 611a-611i may employ the deep learning based optical flow estimation models using any suitable technique or techniques such as those discussed with respect to FIG. 3. For example, each partition pair may provide a 6 channel input volume having a height and width matching the size of the partitions and a depth corresponding to the color channels of the partition pair.

Merge module 612 receives high resolution optical flow results 604a-604i and merge module 612 merges them to form a final high resolution optical flow map 605. Final high resolution optical flow map 605 may have any suitable data structure such as a data structure representative of a per pixel motion vector map having a resolution of input images 101, 102. Merge module 612 may merge high resolution optical flow results 604a-604i using any suitable technique or techniques. In embodiments where no overlap among partitions 601a-601i, 602a-602i are used, merge module 612 may populate high resolution optical flow map 605 with the motion vectors of the pertinent ones of high resolution optical flow results 604a-604i and optionally smoothed at the seams as discussed with respect to FIG. 5.

In embodiments where overlap among partitions 601a-601i, 602a-602i is employed, for non-overlapping regions (i.e., the top left portion of high resolution optical flow results 604a, the top portion of high resolution optical flow results 604b, and so on), the pertinent (and only available motion vectors) are again used. For overlapping regions (i.e., the bottom portion of high resolution optical flow results 604a and the top portion of high resolution optical flow results 604d, etc.), the motion vectors of the overlapping portion or region are selected from the high resolution optical flow results having the highest degree of overlap in the field of view of the scene being processed, as discussed herein.

In the illustrated embodiment, high resolution optical flow results 604e have the highest degree of overlap in the field of view and therefore all of high resolution optical flow results 604 are used in high resolution optical flow map 605. For example, high resolution optical flow results 604e have priority due to the highest degree of overlap over high resolution optical flow results 604a-d, f-i. Similarly, each of high resolution optical flow results 604b, d, f, h have a higher priority due to a higher degree of overlap with respect to their neighbors: high resolution optical flow results 604a, c for high resolution optical flow results 604b; high resolution optical flow results 604a, g for high resolution optical flow results 604d; high resolution optical flow results 604c, i for high resolution optical flow results 604f; and high resolution optical flow results 604g, i for high resolution optical flow results 604h. Such priority of high resolution optical flow results 604b, d, f, h may be in any order as they do not overlap with one another. The same principle applies for non-overlapping partitions.

Due to such prioritization, as discussed, all of high resolution optical flow results 604e are employed in high resolution optical flow map 605. Furthermore, only non-overlapping high resolution optical flow results of high resolution optical flow results 604a, c, g, i are used in high resolution optical flow map 605 while overlapping regions of high resolution optical flow results 604b, d, f, h that do not overlap with high resolution optical flow results 604e are included in high resolution optical flow map 605.

Figure 7:
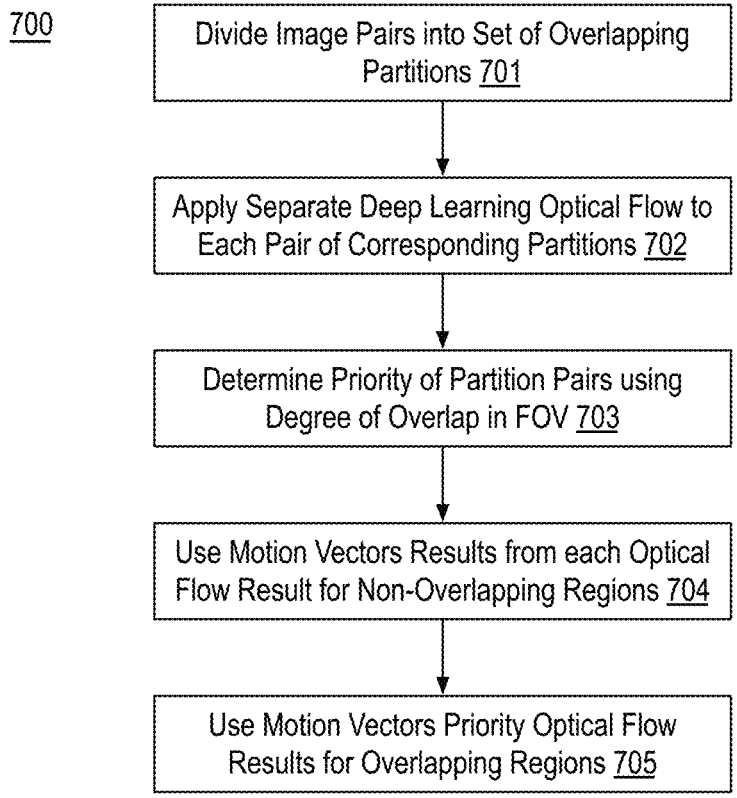
FIG. 7 illustrates an exemplary process for partition input image pairs and employing resulting high resolution optical flow results in a high resolution optical flow map.

FIG. 7 illustrates an exemplary process 700 for partition input image pairs and employing resulting high resolution optical flow results in a high resolution optical flow map, arranged in accordance with at least some implementations of the present disclosure. For example, process 700 may be performed by system 100 via implementation 600 or any other system or device discussed herein to generate a high resolution optical flow map.

Process 700 begins at operation 701, where image pairs are each divided into a set of overlapping partitions. Such partitioning may be performed using any suitable technique or techniques and may divide the images into any number of partitions that overlap by any percentage.

Processing continues at operation 702, where deep learning optical flow is separately applied to each partition pair as discussed with respect to FIG. 6 and elsewhere herein. Processing continues at operation 703, where a priority of the partition pairs is determined using degree of overlap of each of the partition pairs in the field of view of the captured scene. Such priority may be generated prior to the processing of image pairs in some embodiments and may be based on the camera characteristics, orientation, and layout in 3D space in the image capture as well as the layout of the captured scene and the image type (e.g., planar, equirectangular image of a fisheye image capture, etc.). In some embodiments, a degree or percentage of expected overlap for each partition pair is determined. In some embodiments, a center partition may have an expected overlap of 100%, edge partitions may have an expected overlap in the range of about 60-80%, and corner partitions may have an expected overlap in the range of about 40-60%; however, any degrees of overlap may be determined, as discussed, based on the conditions and characteristics of the image capture.

The priority of the partition pairs is then ordered based on the degrees of overlap with greater degrees of overlap having higher priority. It is noted that the priority or priority listing need only resolve ranking among partitions that overlap (either two or more partitions that overlap). For example, with reference to FIG. 6, priority among high resolution optical flow results 604a, b, d, e is needed for overlapping pixels shared by all of high resolution optical flow results 604a, b, d, e. However, no priority among high resolution optical flow results 604a and high resolution optical flow results 604i is needed as there is no overlap therebetween.

Processing continues at operation 704, where, for non-overlapping regions of high resolution optical flow map 605, the only available motion vector results from high resolution optical flow results 604a-i are used. For example, for the top-left portion of high resolution optical flow results 604a, only high resolution optical flow results 604a provide optical flow data and those results are used in high resolution optical flow map 605. Similar regions include the top portion of high resolution optical flow results 604b, the top-right portion of high resolution optical flow results 604c, and so on.

Processing continues at operation 705, where, for each overlapping region of high resolution optical flow map 605, motion vectors are used from the high resolution optical flow results 604a-i having the highest priority in the region as determined at operation 703. For example, the bottom-right region of high resolution optical flow results 604a, the top-right region of high resolution optical flow results 604d, and the top-left region of high resolution optical flow results 604e all overlap and high resolution optical flow results 604e may be used based on those partitions having the highest degree of overlap in the field of view as discussed. Similar regions of overlap include the bottom portion of high resolution optical flow results 604a and the top portion of high resolution optical flow results 604d (but to the left of the previously discussed overlap), and so on.

Figure 8:
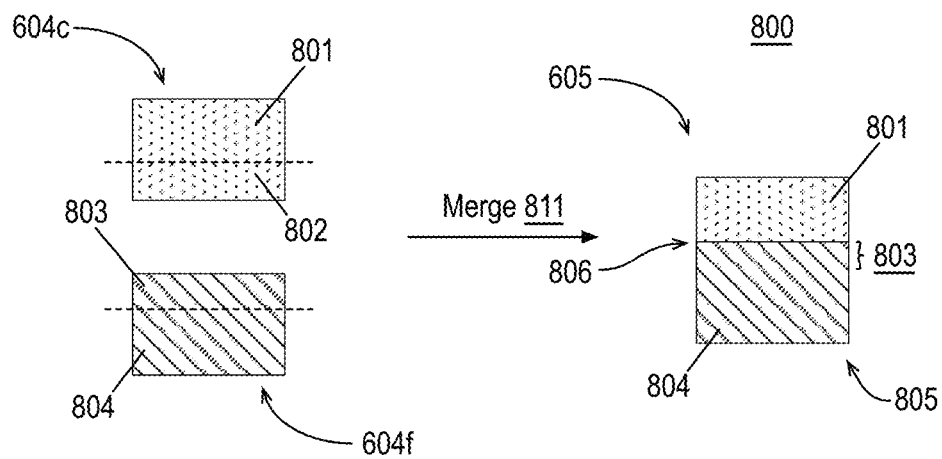
FIG. 8 is an illustration of an example merger of overlapping high resolution optical flow results to form a portion of high resolution optical flow map.

FIG. 8 is an illustration of an example merger 800 of overlapping high resolution optical flow results 604c, 604f to form a portion of high resolution optical flow map 605, arranged in accordance with at least some implementations of the present disclosure. In the illustration of FIG. 8, the overlapping portion of high resolution optical flow results 604e are not shown for the sake of clarity of presentation. As shown in FIG. 8, high resolution optical flow results 604c include a non-overlapping region 801 and an overlapping region 802 (i.e., that overlaps with a region of high resolution optical flow results 6040. Similarly, high resolution optical flow results 604f, which is shown separate from high resolution optical flow results 604c for the sake of clarity, include a non-overlapping region 804 and an overlapping region 803 (i.e., that overlaps with region 802 of high resolution optical flow results 604c).

As discussed with respect to FIG. 7, a priority is established high resolution optical flow results 604c and high resolution optical flow results 604f to determine which results (e.g., motion vectors from region 802 or region 803 are to be employed in high resolution optical flow map 605). In the illustrated example, high resolution optical flow results 604f has a higher priority due to having a greater overlap in the field of view of input images 101, 102.

As shown, based on such priority, high resolution optical flow results 604c, f are merged as shown with respect to merge operation 811 such that a merged region includes the optical flow data (e.g., motion vectors) from region 801, region 803, and region 805. Notably, regions 801, 804 are used due to being non-overlapping regions and region 803 is used based on the priority of high resolution optical flow results 604f In some embodiments, the motion vectors at a seam 806 between regions 801, 803 may be smoothed using any suitable technique or techniques such as those discussed with respect to FIG. 5.

With reference to FIG. 6, processing using a multi-level optical flow estimation framework may proceed as follows. Let $N_y$ and $N_x$ represent the height and width of an input stereo pair of images (i.e., input images 101, 102) at their original resolution. In some embodiments, one or more localized partitions are integrated into a multi-level optical flow estimation framework. In one branch, the input stereo pair (i.e., input images 101, 102) are down sampled (i.e., via downsample modules 213, 214) to the highest resolution that meets the resolution constraints (e.g., GPU memory constraints) of a deep learning based optical flow estimation technique being employed and used as input (i.e., input volume 203) to the optical flow network (i.e., as implemented via deep learning optical flow module 217). The resulting estimated flow map (i.e., low resolution optical flow results 205) of this branch are then upsampled to the original resolution of the input stereo pairs (i.e., input images 101, 102) to generate an upsampled estimated flow map (i.e., high resolution optical flow results 207). In some embodiments, the downsampling is by a factor of 2 in both the horizontal and vertical directions (i.e., the downsampled images are ½ the resolution of input images 101, 102 in both the horizontal and vertical directions).

For example, given $N_y$ and $N_y$ represent the height and width of an input stereo pair of images (i.e., input images 101, 102), partitions may be defined using overlapping windows or partitions (i.e., partitions 601a-i, 602a-i) of size [$N_y/2$ and $N_y/2$] that may match, for example, the maximum window size that meets the resolution constraints (e.g., GPU memory constraints) of a deep learning based optical flow estimation technique being employed without the need for down sampling. Furthermore, steps of size [$N_y/4$ and $N_y/4$] may be taken to provide defined overlapping windows or partitions (i.e., partitions 601a-i, 602a-i). Such partitioning results in 9 partition pairs with windows or partitions (i.e., partitions 601a-i, 602a-i) covering the top/middle/bottom rows and left/middle/right columns of the input stereo pair of images (i.e., input images 101, 102).

Optical flow maps (i.e., high resolution optical flow results 604a-604i) are estimated for each partition stereo pair using the deep learning based optical flow estimation technique. For example, FlowNet2 or other CNN based optical flow estimation architecture may be used to generate localized optical flow estimations (i.e., high resolution optical flow results 604a-604i). The localized optical flow estimations (i.e., high resolution optical flow results 604a-604i) for the spatial partitions (.e., partitions 601a-i, 602a-i) of the input stereo pair (i.e., input images 101, 102) are merged to provide an optical flow estimate (i.e., high resolution optical flow map 605) for the input stereo pair (.e., input images 101, 102) that is highly accurate and suitable for view interpolation and other applications. In some embodiments, the merging technique includes replacement with prioritizing optical flow estimations from partition pairs that have higher degree of overlap between the field of view (FOV) of the stereo pair (.e., input images 101, 102).

Figure 9:
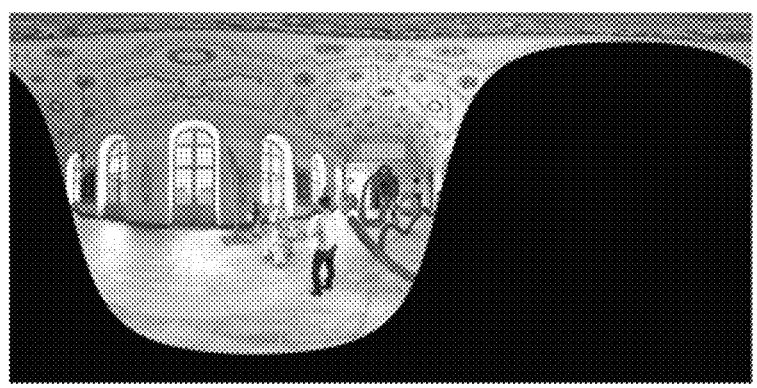
FIG. 9 illustrates an example pair of input images and a resultant optical flow map generated using the techniques discussed herein in comparison with a ground truth optical flow map.
Figure 9:
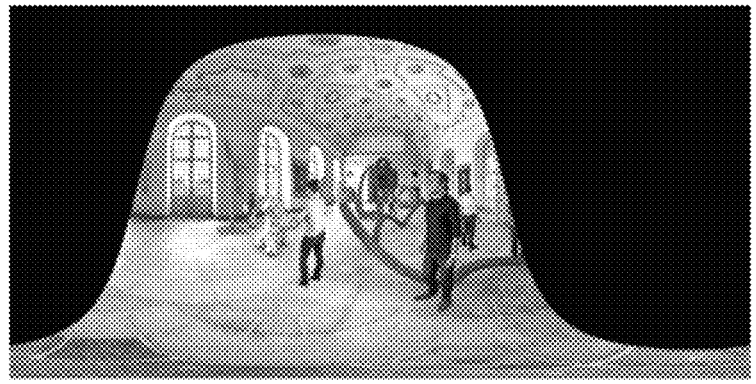
Figure 9:
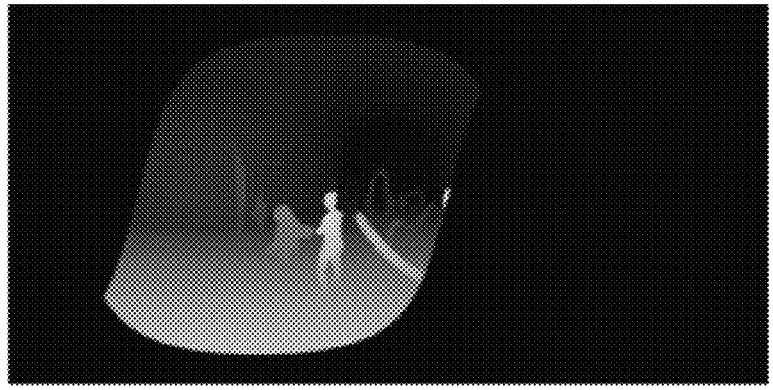
Figure 9:
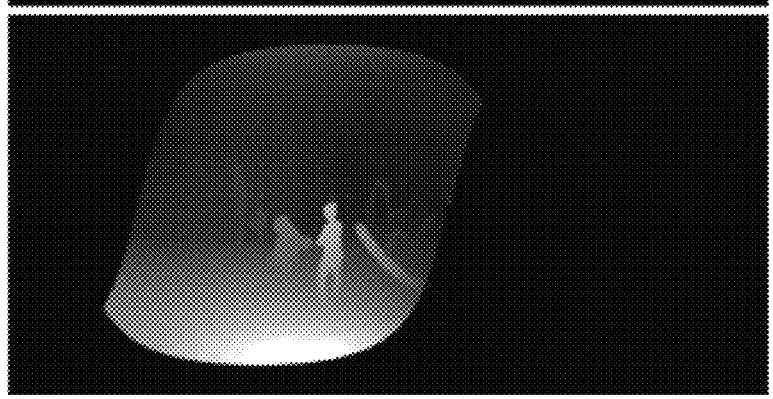

FIG. 9 illustrates an example pair of input images 901, 902 and a resultant optical flow map 903 generated using the techniques discussed herein in comparison with a ground truth optical flow map 904, arranged in accordance with at least some implementations of the present disclosure. As shown in FIG. 9, in some embodiments, equirectangular images representative of corresponding fisheye images may be used. As shown with respect to resultant optical flow map 903 and ground truth optical flow map 904, resultant optical flow map 903 closely matches ground truth optical flow map 904. Furthermore, resultant optical flow map 903 is absent discontinuities, defects, and other artifacts that can cause difficulties in image interpolation or other subsequent processing.

The techniques discussed herein provides an approach for multi-level optical flow estimation based on spatial partitioning of the input stereo pair. Such techniques generate accurate optical flow estimation using deep learning-based flow estimation that suffer from resolution constraints such as large GPU memory constraints. Improved optical flow estimations (both quantitative and qualitative) that lead to the enhancement of view interpolation results or other downstream processing are attained. Furthermore, the discussed techniques advantageously provide flexibility to adjust the computational cost vs. the desired accuracy.

Figure 10:
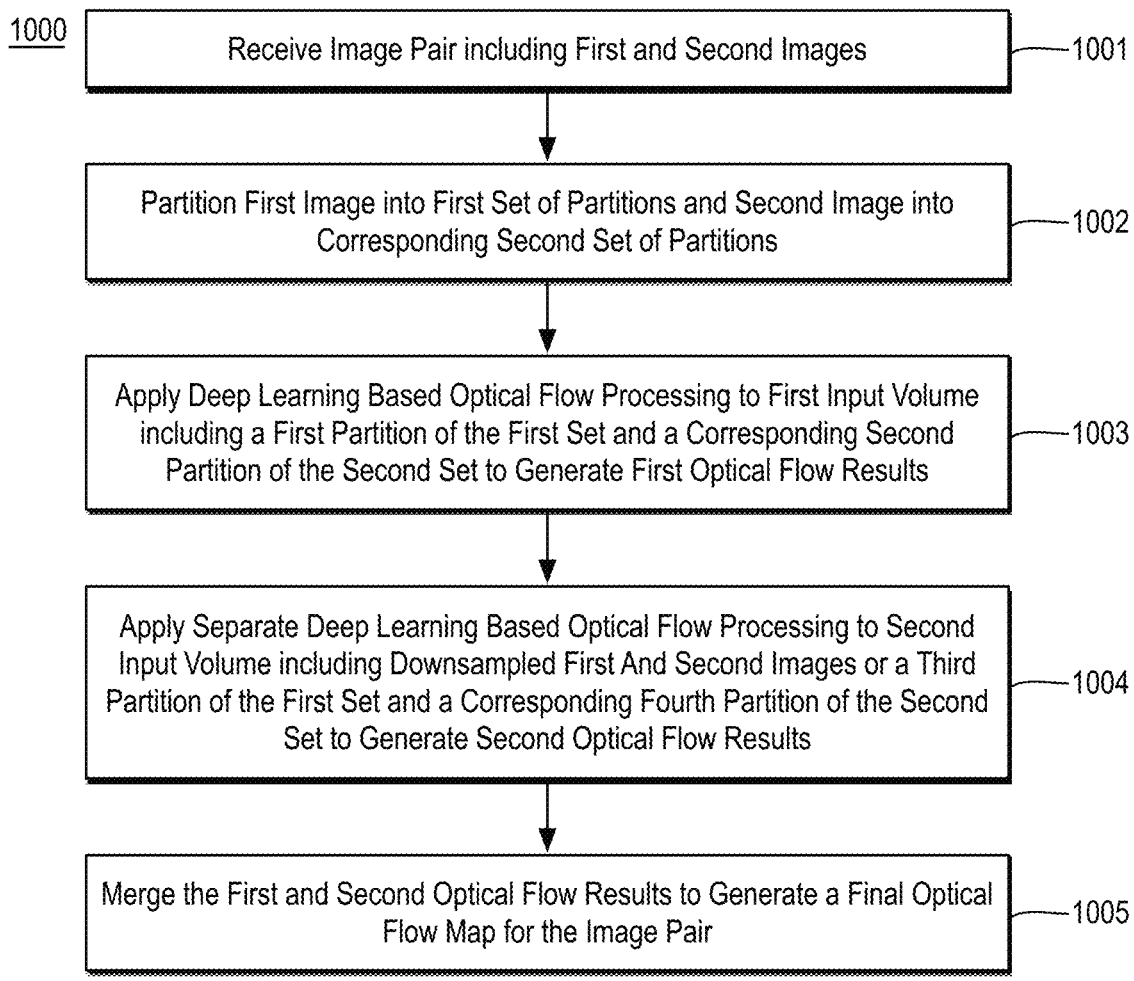
FIG. 10 is a flow diagram illustrating an example process for performing multi-level optical flow for input images.

FIG. 10 is a flow diagram illustrating an example process 1000 for performing multi-level optical flow for input images, arranged in accordance with at least some implementations of the present disclosure. Process 1000 may include one or more operations 1001-1005 as illustrated in FIG. 10. Process 1000 may form at least part of a multi-level optical flow process, an optical flow process, an image interpolation process, etc. By way of non-limiting example, process 1000 may form at least part of a multi-level optical flow process as performed by system 100 as discussed herein. Furthermore, process 1000 will be described herein with reference to system 1100 of FIG. 11.

Figure 11:
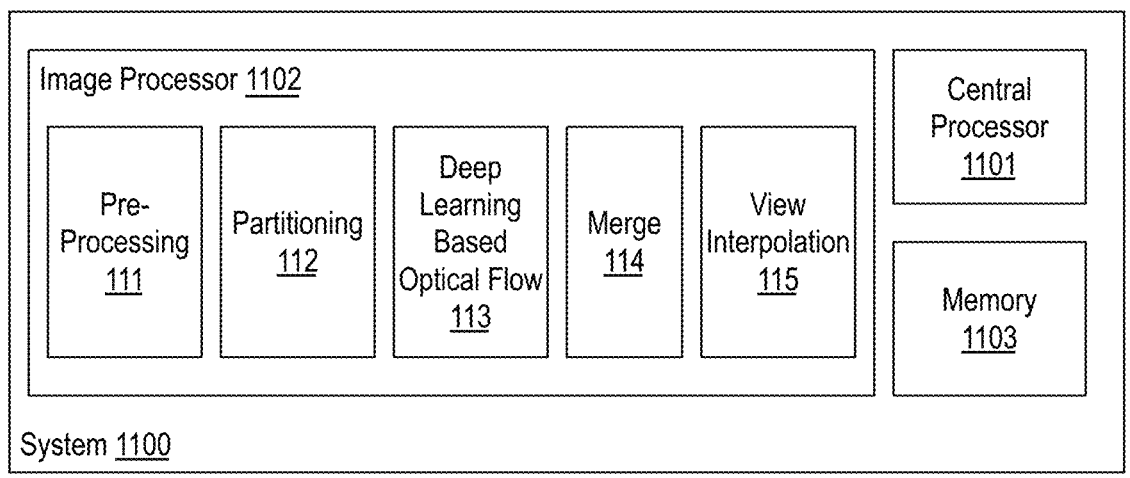
FIG. 11 is an illustrative diagram of an example system for performing multi-level optical flow for input images.

FIG. 11 is an illustrative diagram of an example system 1100 for performing multi-level optical flow for input images, arranged in accordance with at least some implementations of the present disclosure. As shown in FIG. 11, system 1100 may include a central processor 1101, an image processor 1102, and a memory 1103. Also as shown, image processor 1102 may include or implement one or more of initialization module 111, dense 3D reconstruction module 112, per object real time calibration module 113, and virtual view module 114. In the example of system 1100, memory 1103 may store image data, pre-processed image data, downsampled image data, image partition data, optical flow results, optical flow data, optical flow map data, motion vector map data, interpolated image data, or any other data discussed herein.

As shown, in some examples, one or more or portions of pre-processing module 111, partitioning module 112, deep learning based optical flow module 113, merge module 114, and view interpolation module 115 are implemented via image processor 1102. In other examples, one or more or portions of pre-processing module 111, partitioning module 112, deep learning based optical flow module 113, merge module 114, and view interpolation module 115 are implemented via central processor 1101, an image processing unit, an image processing pipeline, an image signal processor, a graphics processor, a graphics processing unit, or the like. In some examples, one or more or portions of pre-processing module 111, partitioning module 112, deep learning based optical flow module 113, merge module 114, and view interpolation module 115 are implemented in hardware as a system-on-a-chip (SoC). In some examples, one or more or portions of pre-processing module 111, partitioning module 112, deep learning based optical flow module 113, merge module 114, and view interpolation module 115 are implemented in hardware via a FPGA.

Image processor 1102 may include any number and type of image or graphics processing units that may provide the operations as discussed herein. Such operations may be implemented via software or hardware or a combination thereof. For example, image processor 1102 may include circuitry dedicated to manipulate and/or analyze images obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. In an embodiment, one or more or portions of pre-processing module 111, partitioning module 112, deep learning based optical flow module 113, merge module 114, and view interpolation module 115 are implemented via an execution unit (EU) of image processor 1102. The EU may include, for example, programmable logic or circuitry such as a logic core or cores that may provide a wide array of programmable logic functions. In an embodiment, one or more or portions of pre-processing module 111, partitioning module 112, deep learning based optical flow module 113, merge module 114, and view interpolation module 115 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where, an image pair including a first image and a second image are received for optical flow processing. The first and second images may be any suitable images such as planar images, equirectangular images, or the like. In some embodiments, the first and second images are equirectangular images representative of corresponding fisheye images attained via fisheye cameras. Furthermore, the first and second images may be paired for optical flow processing due to being images captured of the same scene for stereoscopic processing or view interpolation processing, due to being temporally adjacent images of a video stream, or the like. The first and second images may be characterized as pictures, frames, or the like and may have any suitable data structure.

Processing continues at operation 1002, where the first image is divided, segmented, or partitioned into a first set of one or more partitions and the second image is divided, segmented, or partitioned into a corresponding second set of one or more partitions. As discussed, such partitions are corresponding in that they include the same or substantially the same regions of the first and second images. As discussed, such partitioning does not downscale or otherwise alter the resolution of the first and second images. The first and second images may be partitioned into any number and orientation of partitions. In some embodiments, the first and second images are portioned into a singe partitioning and the multi-level optical flow techniques are also applied to downsampled versions of the first and second images as discussed further below. In some embodiments, the first and second images are partitioned into a number (e.g., four, nine, sixteen, or more) non-overlapping partitions. In some embodiments, the first and second images are partitioned into a number (e.g., four, nine, sixteen, or more) overlapping partitions.

Processing continues at operation 1003, where first deep learning based optical flow processing is applied to a first input volume including a first partition of the first set of one or more partitions and a corresponding second partition of the second set of one or more partitions to generate first optical flow results. The first and second partitions correspond such that include the same or substantially the same regions of the first and second images. The first deep learning based optical flow processing may include any suitable optical flow processing such as CNN based optical flow processing.

Processing continues at operation 1004, where, separate from the first deep learning based optical flow processing, second deep learning based optical flow processing is applied to a second input volume including one of downsampled first and second images corresponding to the first and second images, respectively, or a third partition of the first set of one or more partitions and a corresponding fourth partition of the second set of one or more partitions to generate second optical flow results. As used herein the term separate deep learning based optical flow processing indicates the processing is applied to differing input volumes. Such processing may be the same (i.e., by applying the same optical flow model) or different (i.e., by applying a different optical flow model). In some embodiments, the first and second deep learning based optical flow processing includes application of the same deep learning based optical flow model.

Processing continues at operation 1005, where the first and second optical flow results are merged to generate a final optical flow map for the image pair. Such merger my be performed using any suitable technique or techniques such as those discussed further herein below depending on the type of multi-level optical flow framework employed. In some embodiments, the merging techniques include selecting first motion vectors from the first optical flow results for a first region of the final optical flow map and second motion vectors from the second optical flow results for a second region of the final optical flow map and smoothing the motion vectors across a boundary between the first and second regions.

As discussed, in some embodiments, the first deep learning based optical flow processing is applied to a first input volume including the first and second partitions and the second deep learning based optical flow processing is applied to a second input volume including downsampled first and second images corresponding to the first and second images. In some embodiments, the first and second sets of partitions each include a single partition including the first and second partitions, respectively, the second input volume includes the downsampled first and second images, and process 1000 further includes downsampling the first and second images to the downsampled first and second images such that the downsampling provides an image size reduction below a resolution constraint of the second deep learning based optical flow processing. In some embodiments, the first and second partitions correspond to a maximum overlap region of the image pair that meets a second resolution constraint of the second deep learning based optical flow processing. In some embodiments, the first optical flow results include first motion vectors at a first resolution of the first and second images, the second optical flow results include second motion vectors at a second resolution of the downsampled first and second images, and the final optical flow map includes the first motion vectors for a first region of the final optical flow map corresponding to the first and second partitions and upsampled motion vectors from the second in a remaining region of the final optical flow map.

As discussed, in some embodiments, the first deep learning based optical flow processing is applied to a first input volume including the first and second partitions and the second deep learning based optical flow processing is applied to the third and fourth partitions. In some embodiments, the first and second sets of partitions each include two or more partitions, the second input volume includes the third and fourth partitions, the first and second optical flow results include first and second motion vectors, respectfully, at a resolution of the first and second images, and the final optical flow map includes the first motion vectors from the first optical flow results for a first region of the final optical flow map and the second motion vectors from the second optical flow results for a second region of the final optical flow map.

In some embodiments, the first and second sets of partitions each include two or more overlapping partitions, the first partition overlapping the third partition and the second partition overlapping the fourth partition, the second input volume includes the third and fourth partitions, and process 1000 further includes selecting, for a region of the final optical flow map corresponding to an overlap of the first and third partitions and a corresponding overlap of the second and fourth partitions, motion vectors from one of the first or second optical flow results based on a greater of a first degree of overlap in a field of view of the first and second images between the first and third partitions and a second degree of overlap in the field of view between the second and fourth partitions. In some embodiments, the first and second sets of partitions each include not fewer than nine overlapping partitions.

The resultant final optical flow map may be used in any suitable application or context. In some embodiments, process 1000 further includes generating an interpolated image using the image pair and the final optical flow map results. In other embodiments, the resultant final optical flow map are employed in one of an artificial intelligence application, a virtual reality application, an augmented reality application, or an image processing application.

Process 1000 may be repeated any number of times either in series or in parallel for any number of image pairs, sets of images, or the like. Process 1000 may be implemented by any suitable device(s), system(s), or platform(s) such as those discussed herein. In an embodiment, at least a portion of process 1000 is implemented by a device having a memory to store data corresponding to input images, as well as any other discussed data structure, and one or more processors to perform any of operations 1001-1005. In an embodiment, the memory and a processor are implemented via a monolithic field programmable gate array integrated circuit. As used herein, the term monolithic indicates a device that is discrete from other devices, although it may be coupled to other devices for communication and power supply. In some embodiments, the memory and one or more processors are implemented in different devices.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
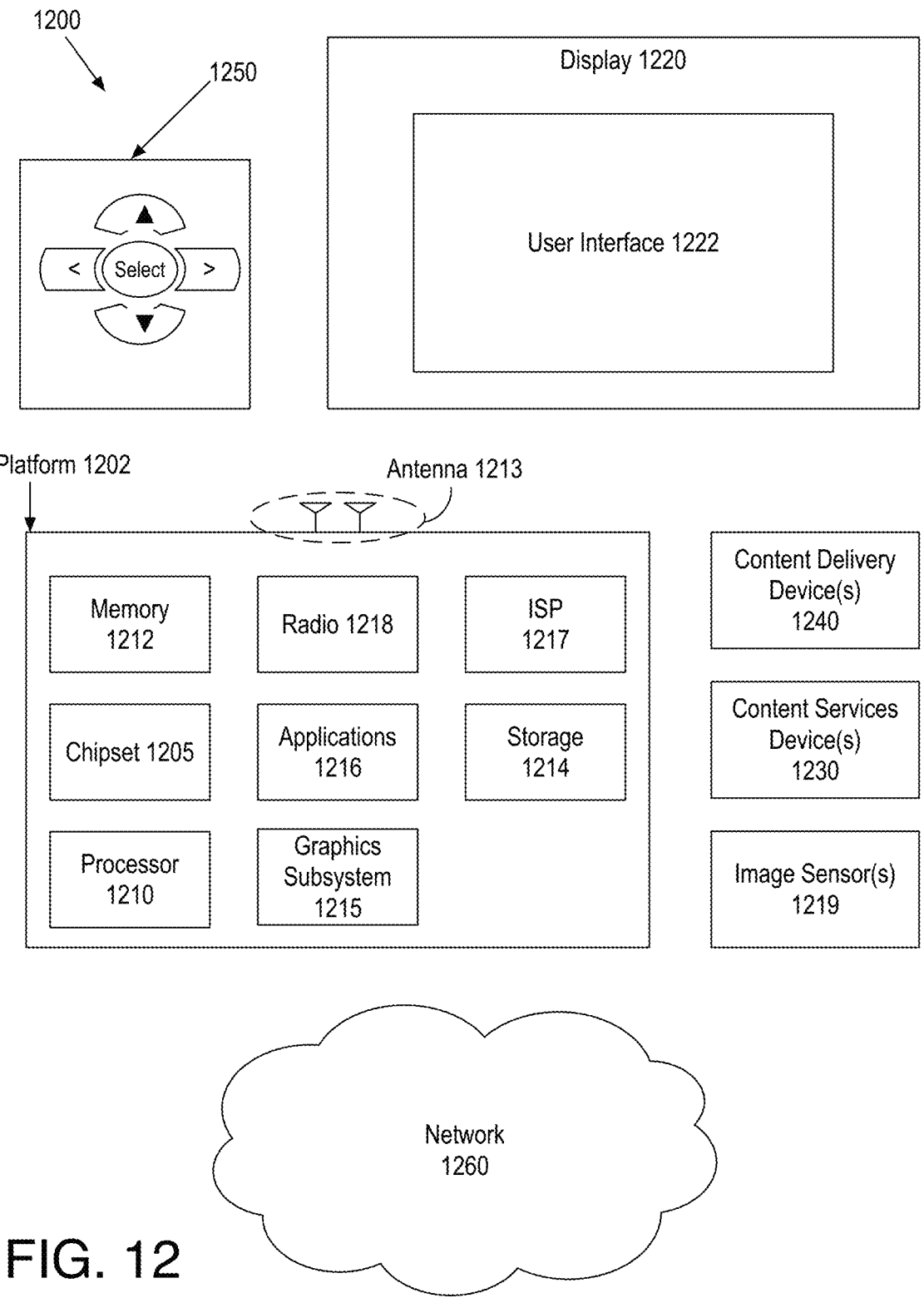
FIG. 12 is an illustrative diagram of an example system.

FIG. 12 is an illustrative diagram of an example system 1200, arranged in accordance with at least some implementations of the present disclosure. In various implementations, system 1200 may be a mobile device system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth. System 1200 may perform any techniques and/or implement any modules or components discussed herein.

In various implementations, system 1200 includes a platform 1202 coupled to a display 1220. Platform 1202 may receive content from a content device such as content services device(s) 1230 or content delivery device(s) 1240 or other content sources such as image sensors 1219. For example, platform 1202 may receive image data as discussed herein from image sensors 1219 or any other content source. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216, image signal processor 1217 and/or radio 1218. Chipset 1205 may provide intercommunication among processor 1210, memory 1212, storage 1214, graphics subsystem 1215, applications 1216, image signal processor 1217 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Image signal processor 1217 may be implemented as a specialized digital signal processor or the like used for image processing. In some examples, image signal processor 1217 may be implemented based on a single instruction multiple data or multiple instruction multiple data architecture or the like. In some examples, image signal processor 1217 may be characterized as a media processor. As discussed herein, image signal processor 1217 may be implemented based on a system on a chip architecture and/or based on a multi-core architecture.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

Image sensors 1219 may include any suitable image sensors that may provide image data based on a scene. For example, image sensors 1219 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1219 may include any device that may detect information of a scene to generate image data.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
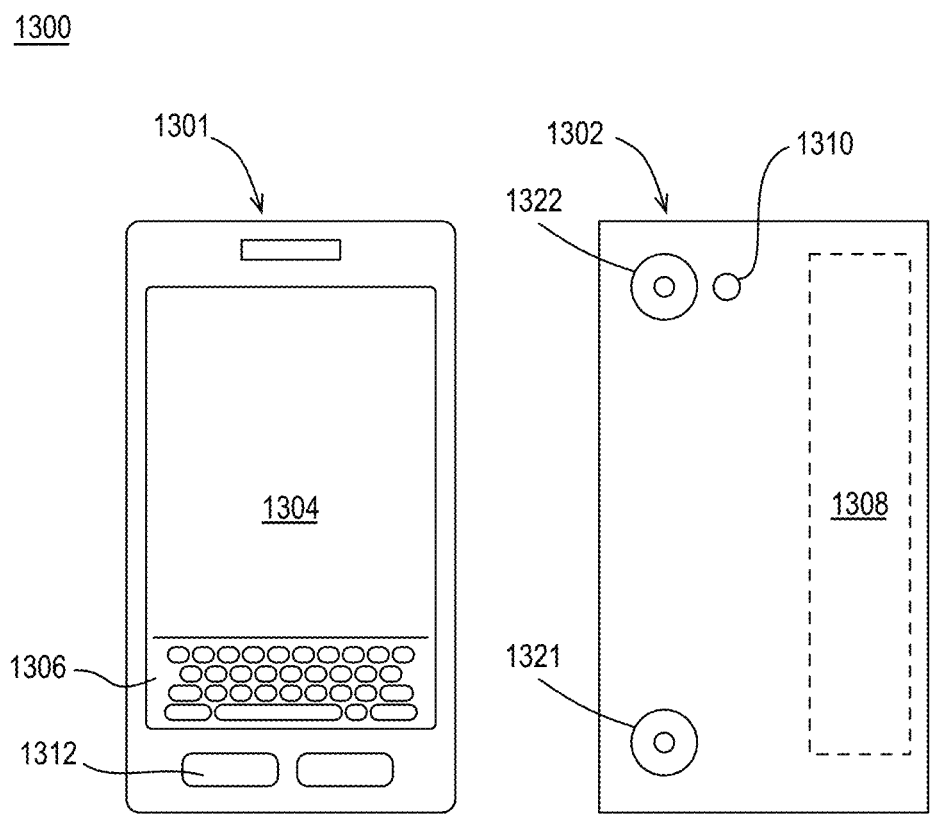
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems, components, or modules discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, a color camera 1321, a color camera 1322, and an integrated antenna 1308. In some embodiments, color camera 1321 and color camera 1322 attain planar images as discussed herein. In some embodiments, device 1300 does not include color camera 1321 and 1322 and device 1300 attains input image data (e.g., any input image data discussed herein) from another device. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 1321, 1322, and a flash 1310 integrated into back 1302 (or elsewhere) of device 1300. In other examples, color cameras 1321, 1322, and flash 1310 may be integrated into front 1301 of device 1300 or both front and back sets of cameras may be provided. Color cameras 1321, 1322 and a flash 1310 may be components of a camera module to originate color image data with IR texture correction that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing optical flow for input images comprises receiving an image pair comprising a first image and a second image, partitioning the first image into a first set of one or more partitions and the second image into a corresponding second set of one or more partitions, applying first deep learning based optical flow processing to a first input volume comprising a first partition of the first set of one or more partitions and a corresponding second partition of the second set of one or more partitions to generate first optical flow results, applying, separate from the first deep learning based optical flow processing, second deep learning based optical flow processing to a second input volume comprising one of downsampled first and second images corresponding to the first and second images, respectively, or a third partition of the first set of one or more partitions and a corresponding fourth partition of the second set of one or more partitions to generate second optical flow results, and merging the first and second optical flow results to generate a final optical flow map for the image pair.

In one or more second embodiments, further to the first embodiment, the first and second sets of partitions each comprise a single partition comprising the first and second partitions, respectively, the second input volume comprises the downsampled first and second images, and the method further comprises downsampling the first and second images to the downsampled first and second images, wherein said downsampling provides an image size reduction below a resolution constraint of the second deep learning based optical flow processing.

In one or more third embodiments, further to the first or second embodiments, the first and second partitions correspond to a maximum overlap region of the image pair that meets a second resolution constraint of the second deep learning based optical flow processing.

In one or more fourth embodiments, further to any of the first through third embodiments, the first optical flow results comprise first motion vectors at a first resolution of the first and second images, the second optical flow results comprise second motion vectors at a second resolution of the downsampled first and second images, and the final optical flow map comprises the first motion vectors for a first region of the final optical flow map corresponding to the first and second partitions and upsampled motion vectors from the second in a remaining region of the final optical flow map.

In one or more fifth embodiments, further to any of the first through fourth embodiments, the first and second sets of partitions each comprise two or more partitions, the second input volume comprises the third and fourth partitions, the first and second optical flow results comprise first and second motion vectors, respectfully, at a resolution of the first and second images, and the final optical flow map comprises the first motion vectors from the first optical flow results for a first region of the final optical flow map and the second motion vectors from the second optical flow results for a second region of the final optical flow map.

In one or more sixth embodiments, further to any of the first through fifth embodiments, the first and second sets of partitions each comprise two or more overlapping partitions, the first partition overlapping the third partition and the second partition overlapping the fourth partition, the second input volume comprises the third and fourth partitions, and the method further comprises selecting, for a region of the final optical flow map corresponding to an overlap of the first and third partitions and a corresponding overlap of the second and fourth partitions, motion vectors from one of the first or second optical flow results based on a greater of a first degree of overlap in a field of view of the first and second images between the first and third partitions and a second degree of overlap in the field of view between the second and fourth partitions.

In one or more seventh embodiments, further to any of the first through sixth embodiments, the first and second sets of partitions each comprise not fewer than nine overlapping partitions.

In one or more eighth embodiments, further to any of the first through seventh embodiments, said merging the first and second optical flow results comprises selecting first motion vectors from the first optical flow results for a first region of the final optical flow map and second motion vectors from the second optical flow results for a second region of the final optical flow map and smoothing the motion vectors across a boundary between the first and second regions.

In one or more ninth embodiments, further to any of the first through eighth embodiments, the method further comprises generating an interpolated image using the image pair and the final optical flow map results.

In one or more tenth embodiments, further to any of the first through ninth embodiments, the first and second deep learning based optical flow processing comprise application of a same deep learning based optical flow model.

In one or more eleventh embodiments, further to any of the first through tenth embodiments, the first and second images comprise equirectangular images representative of corresponding fisheye images attained via fisheye cameras.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
   a memory to store at least a portion of an image pair, the image pair including a first image and a second image;
   computer readable instructions; and
   at least one programmable circuit to be programmed by the computer readable instructions to:
      apply a first machine learning model to a first input volume associated with a first partition of the first image and a corresponding second partition of the second image to generate first optical flow data associated with a full resolution of the image pair;
      apply a second machine learning model to a second input volume different from the first input volume, the second input volume associated with a downsampled version of the first image and a downsampled version of the second image to generate second optical flow data associated with a lower resolution than the full resolution of the image pair; and
      simultaneously apply at least a portion of the first optical flow data associated with the full resolution and at least a portion of the second optical flow data associated with the lower resolution to a merge operation, the merge operation to generate an optical flow map for the image pair.

2. The system of claim 1, wherein one or more of the at least one programmable circuit is to:
   downsample the first image to obtain the downsampled version of the first image; and
   downsample the second image to obtain the downsampled version of the second image, the downsampling of the first and second images to provide an image size reduction below a resolution constraint of the second machine learning model.

3. The system of claim 1, wherein the first partition and the second partition correspond to a maximum overlap region of the image pair that meets a resolution constraint of the first machine learning model.

4. The system of claim 1, wherein the first optical flow data includes first motion vectors at the full resolution of the image pair, the second optical flow data includes second motion vectors at the lower resolution, and the optical flow map includes the first motion vectors for a first region of the optical flow map corresponding to the first partition and the second partition, and upsampled versions of the second motion vectors for a remaining region of the optical flow map.

5. The system of claim 4, wherein the remaining region is a second region, and one or more of the at least one programmable circuit is to apply a median filter to a third region of the optical flow map to smooth the optical flow map, the third region including a seam that separates the first region and the second region of the optical flow map.

6. The system of claim 4, wherein the remaining region is a second region, and one or more of the at least one programmable circuit is to apply a two-dimensional filter having a diamond shape to a third region of the optical flow map to smooth the optical flow map, the third region including a seam that separates the first region and the second region of the optical flow map.

7. The system of claim 1, wherein one or more of the at least one programmable circuit is to generate an interpolated image based on the image pair and the optical flow map.

8. The system of claim 1, wherein the first image and the second image are equirectangular images representative of corresponding fisheye images obtained via fisheye cameras.

9. A method comprising:
   applying a first machine learning model to a first input volume associated with a first partition of a first image and a corresponding second partition of a second image to generate first optical flow data associated with a first resolution of an image pair, the image pair including the first image and the second image;
   applying a second machine learning model to a second input volume different from the first input volume, the second input volume associated with a downsampled version of the first image and a downsampled version of the second image to generate second optical flow data associated with a second resolution, the second resolution lower than the first resolution; and
   simultaneously applying at least a portion of the first optical flow data associated with the first resolution and at least a portion of the second optical flow data associated with the second resolution to a merge operation, the merge operation to generate an optical flow map for the image pair.

10. The method of claim 9, including:
    downsampling the first image to obtain the downsampled version of the first image; and
    downsampling the second image to obtain the downsampled version of the second image, the downsampling of the first and second images providing an image size reduction below a resolution constraint of the second machine learning model.

11. The method of claim 9, wherein the first optical flow data includes first motion vectors at the first resolution, the second optical flow data includes second motion vectors at the second resolution, and the optical flow map includes the first motion vectors for a first region of the optical flow map corresponding to the first partition and the second partition, and upsampled versions of the second motion vectors for a remaining region of the optical flow map.

12. The method of claim 9, wherein the first partition and the second partition correspond to a maximum overlap region of the image pair.

13. The method of claim 9, further including generating an interpolated image based on the image pair and the optical flow map.

14. The method of claim 9, wherein the first image and the second image are equirectangular images representative of corresponding fisheye images obtained via fisheye cameras.

15. At least one volatile memory device or non-volatile storage device comprising instructions to cause at least one programmable circuit to at least:
    apply a first machine learning model to a first input volume associated with a first partition of a first image and a corresponding second partition of a second image to generate first optical flow data associated with a first resolution of an image pair, the image pair including the first image and the second image;

apply a second machine learning model to a second input volume different from the first input volume, the second input volume associated with a downsampled version of the first image and a downsampled version of the second image to generate second optical flow data associated with a second resolution, the second resolution lower than the first resolution; and simultaneously apply at least a portion of the first optical flow data associated with the first resolution and at least a portion of the second optical flow data associated with the second resolution to a merge operation, the merge operation to generate an optical flow map for the image pair.

16. The at least one machine readable volatile memory device or non-volatile storage device of claim 15, wherein the instructions are to cause one or more of the at least one programmable circuit to:

downsample the first image to obtain the downsampled version of the first image; and downsample the second image to obtain the downsampled version of the second image, the downsampling of the first and second images to provide an image size reduction below a resolution constraint of the second machine learning model.

17. The at least one volatile memory device or non-volatile storage device of claim 15, wherein the first optical flow data includes first motion vectors at the first resolution of the image pair, the second optical flow data includes second motion vectors at the second resolution, and the optical flow map includes the first motion vectors for a first region of the optical flow map corresponding to the first partition and the second partition, and upsampled versions of the second motion vectors for a remaining region of the optical flow map.

18. The at least one volatile memory device or non-volatile storage device of claim 15, wherein the first partition and the second partition correspond to a maximum overlap region of the image pair.

19. The at least one volatile memory device or non-volatile storage device of claim 15, wherein the instructions are to cause one or more of the at least one programmable circuit to generate an interpolated image based on the image pair and the optical flow map.

20. The at least one machine readable volatile memory device or non-volatile storage device of claim 15, wherein the first image and the second image are equirectangular images representative of corresponding fisheye images obtained via fisheye cameras.

* * * * *

UNITED STATES PATENT AND TRADEMARK OFFICE
CERTIFICATE OF CORRECTION

PATENT NO. : 12,394,070 B2
APPLICATION NO. : 17/029896
DATED : August 19, 2025
INVENTOR(S) : Pourian et al.

Page 1 of 1

It is certified that error appears in the above-identified patent and that said Letters Patent is hereby corrected as shown below:

In the Drawings

Sheet 1, FIG. 1, in the text labeled with reference numeral 108, replace "Interpoloated" with -- Interpolated --

In the Claims

Column 31, Line 17 (Claim 16), delete "machine readable"

Column 32, Line 21 (Claim 20), delete "machine readable"

Signed and Sealed this
Eleventh Day of November, 2025

John A. Squires
*Director of the United States Patent and Trademark Office*